(12) United States Patent
Vinton et al.

(10) Patent No.: US 7,516,064 B2
(45) Date of Patent: Apr. 7, 2009

(54) ADAPTIVE HYBRID TRANSFORM FOR SIGNAL ANALYSIS AND SYNTHESIS

(75) Inventors: Mark Stuart Vinton, San Francisco, CA (US); Grant Allen Davidson, Burlingame, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 711 days.

(21) Appl. No.: 10/783,951

(22) Filed: Feb. 19, 2004

(65) Prior Publication Data

US 2005/0185850 A1   Aug. 25, 2005

(51) Int. Cl.
*G10L 19/02* (2006.01)
*G10L 21/00* (2006.01)
(52) U.S. Cl. .................. 704/206; 704/200; 704/201; 704/200.1; 704/205; 704/500; 704/501
(58) Field of Classification Search ............. 704/200.1, 704/205, 206, 500, 501; 382/240, 248, 250
See application file for complete search history.

(56) References Cited

U.S. PATENT DOCUMENTS

| | | | | |
|---|---|---|---|---|
| 5,107,345 A | * | 4/1992 | Lee | 382/250 |
| 5,214,742 A | * | 5/1993 | Edler | 704/203 |
| 5,357,594 A | * | 10/1994 | Fielder | 704/200.1 |
| 5,394,473 A | | 2/1995 | Davidson et al. | |
| 5,592,584 A | * | 1/1997 | Ferreira et al. | 704/203 |
| 6,246,345 B1 | * | 6/2001 | Davidson et al. | 341/51 |
| 6,430,529 B1 | * | 8/2002 | Huang | 704/229 |
| 6,678,647 B1 | * | 1/2004 | Edler et al. | 704/200.1 |
| 6,799,164 B1 | * | 9/2004 | Araki | 704/500 |
| 6,963,842 B2 | * | 11/2005 | Goodwin | 704/500 |
| 2005/0015259 A1 | * | 1/2005 | Thumpudi et al. | 704/500 |

OTHER PUBLICATIONS

Holmes et al., "Speech Synthesis and Recognition", 2nd Edition, Taylor & Francis, 2001, pp. 161-164.*
ATSC Standard: "Digital Audio Compression (AC-3), Rev. A", Doc A/52A, ATSC Standard, Online! Aug. 20, 2001, pp. 1-140, Washington, D.C. retrieved from the Internet: URL: http://www.atsc.org/standards/a_52a.pd.
Fielder, L., "AC-2 and AC-3: Low-complexity Transform-based Audio Coding", Collected papers on Digital Audio Bit-Rate Reduction, 1996, New York, US.
Bradenburg, J., "Second generation Perceptual Audio Coding: the Hybrid Coder", preprint at the 88th AES Convention, 3-13-9, Montreaux.

(Continued)

*Primary Examiner*—Talivaldis Ivars Smits
*Assistant Examiner*—Douglas C Godbold
(74) *Attorney, Agent, or Firm*—David N. Lathrop, Esq.; Gallagher & Lathrop

(57) ABSTRACT

Analysis and synthesis filter banks such as those used in audio and video coding systems are each implemented by a hybrid transform that comprises a primary transform in cascade with one or more secondary transforms. The primary transforms for the filter banks implement an analysis/synthesis system in which time-domain aliasing artifacts are cancelled. The secondary transforms, which are in cascade with the primary transforms, are applied to blocks of transform coefficients. The length of the blocks is varied to adapt the time resolution of the analysis and synthesis filter banks.

24 Claims, 3 Drawing Sheets

OTHER PUBLICATIONS

Bocchieri, et al., "Correlation Modeling of MLLR Transform Biases for Rapid HMM Adaptation to New Speakers" Proc. of IEEE International Conference on Acoustics, Speech, and Signal Processing, pp. 2343-2346, 1996.

Bradenburg, et al., "Comparison of Filterbanks for High Quality Audio Coding," IEEE Int. Sym. Circuits and Systems, May 1992, pp. 1336-1339.

Bunton, J., "Multi-resolution FX Correlator," ALMA Memo 447, CSIRO Telecommunications and Industrial Physics, Feb. 2003, pp. 1-10.

Drygajlo, "New Fast Wavelet Packet Transform Algorithms for Frame Synchronized Speech Processing," Proc. of the 4th International Conference on Spoken Language Processing, Philadelphia, USA, pp. 410-413, Oct. 3-6, 1996 <<http://www.asel.udel.edu/icslp/cdrom/vol/417/a417.pdf>>.

Goyal, et al., "Optimal Multiple Description Transform Coding of Gaussian Vectors," Proc. IEEE Data Compression Conference 1998, pp. 388-397.

Greenberg, et al., "The Modulation Spectrogram: in Pursuit of an Invariant Representation of Speech," presented at ICASSP-97, Munich, vol. 3 pp. 1647-1650.

Kryze, et al., T. Appelbaum and J.C. Junqua et al. "A New Noise-Robust Subband Front-End and Its Comparison to PLP," Proc. IEEE ASRU Workshop, Keystone, Colorado, CD-ROM (1999) <<http://asru99.research.att.com/abstracts/1_6109.pdf>>.

Malvar, "Fast Progressive Image Coding without Wavelets," IEEE Data Compression Conference, Snowbird, Utah, Mar. 2000, p. 243-252.

Nagai, et al., "Generalized Unequal Length Lapped Orthogonal Transform for Subband Image Coding," IEEE Transactions on Signal Processing, vol. 48, No. 12, Dec. 2000.

Noll, "Digital Audio for Multimedia," Proc. Sig. Proc. for Multimedia, NATO Advanced Audio Institute, 1999 <<http://www.nue.tu-berlin.de/Publikationen/papers/nato.pdf>>.

Painter, et al., "Perceptual Coding of Digital Audio," "Proc. of the IEEE, Apr. 2000," pp. 451-513.

Painter, et al., "A Review of Algorithms for Perceptual Coding of Digital Audio Signals," Proceedings of International Conference on Digital Signal Processing (DSP), pp. 179-205, Jul. 1997.

Prandoni, P., et al., "An FIR Cascade Structure for Adaptive Linear Prediction," IEEE Transactions on Signal Processing, vol. 46, No. 9, Sep. 1998, pp. 2566-2571.

Princen et al., "Audio Coding With Signal Adaptive Filterbanks," Int. Conf on Acoust., Speech and Sig. Proc., 1995.

Thompson, et al., "A Non-Uniform Modulation Transform for Audio Coding With Increased Time Resolution".

Vargas, et al., "ELT-Based Wavelet Coding of High-Fidelity Audio Signals," IEEE Int. Sym. Circuits and Systems, Chicago, 1993.

Vinton, et al., "Scalable and progressive audio codec," 2001 IEEE International Conference on Acoustics, Speech, and Signal Processing, ICASSP, p. 3277-80 vol. 5.

* cited by examiner

ADAPTIVE HYBRID TRANSFORM FOR SIGNAL ANALYSIS AND SYNTHESIS

TECHNICAL FIELD

The present invention pertains generally to signal analysis and synthesis filter banks such as those that may be used in audio and video coding systems. More particularly, the present invention pertains to analysis and synthesis filter banks implemented by a cascade of block transforms that are able to adapt the time and frequency resolutions of the filter banks.

BACKGROUND ART

Coding systems are often used to reduce the amount of information required to adequately represent a source signal. By reducing information capacity requirements, a signal representation can be transmitted over channels having lower bandwidth or stored on media using less space. Coding can reduce the information capacity requirements of a source signal by removing either redundant components or irrelevant components in the signal. So called perceptual coding methods and systems often use filter banks to reduce redundancy by decorrelating a source signal using a basis set of spectral components, and reduce irrelevancy by adaptive quantization of the spectral components according to psycho-perceptual criteria.

Many perceptual coding systems implement the filter banks by block transforms. In an audio coding system, for example, a source audio signal, which is represented by time segments or blocks of time-domain samples, is transformed into sets of frequency-domain coefficients representing the spectral content of the source signal. The length of the segments establishes both the time resolution and the frequency resolution of the filter bank. Time resolution increases as the segment length decreases. Frequency resolution increases as the segment length increases. Because of this relationship, the choice of segment length imposes a trade off between the time and frequency resolution of a block transform filter bank.

No single choice of segment length can provide an optimum trade off between resolutions for all of the source signal conditions that are encountered by typical coding systems. Slowly varying or stationary source signals generally can be encoded more efficiently if the filter bank has a higher frequency resolution, which can be provided if a longer segment length is used. Rapidly varying or highly non-stationary source signals generally can be encoded more efficiently if the filter bank has a higher time resolution, which can be provided if a shorter segment length is used. By adapting the segment length in response to changing source signal conditions, a block transform filter bank can optimize the trade off between its time and frequency resolution.

A large variety of transforms may be used to implement filter banks in audio coding systems, for example, but a particular Modified Discrete Cosine Transform (MDCT) is widely used because it has several very attractive properties for audio coding including the ability to provide critical sampling while allowing adjacent source signal segments to overlap one another. The MDCT is also attractive because it is able to remove substantially all redundant components in a source signal that is substantially stationary within a segment. Proper operation of the MDCT filter bank requires the use of overlapped source-signal segments and window functions that satisfy certain criteria described in Princen et al., "Subband/Transform Coding Using Filter Bank Designs Based on Time Domain Aliasing Cancellation," Proc. of the 1987 International Conference on Acoustics, Speech and Signal Processing (ICASSP), May 1987, pp. 2161-64. Unfortunately, it is difficult to adapt the time and frequency resolution of MDCT filter banks in response to signal conditions because of the requirements imposed on the window functions that must be applied to overlapping source signal segments.

One known technique sometimes referred to as "window switching" is able to adapt the time resolution of a MDCT filter bank by adaptively switching between two different window functions in response to the detection of certain signal conditions such as abrupt signal changes or amplitude transients. According to this technique, which is described in U.S. Pat. No. 5,214,742 by Edler, issued May 25, 1993, and incorporated herein by reference, segment lengths are not changed but the time resolution is adapted by switching between different window function shapes to reduce the number of non-zero samples in each segment that are transformed by the filter bank. Unfortunately, this technique does not adapt the frequency resolution of the filter bank and the frequency selectivity of the filter bank is seriously degraded whenever the time resolution is reduced because the shape of the window functions needed for window switching must be suboptimal to satisfy the requirements for proper operation of the MDCT.

Another known technique sometimes referred to as "block switching" is similar to the window-switching technique mentioned above in that it also switches between different window function shapes, but the block-switching technique is able to adapt both time and frequency resolutions of a MDCT filter bank by also adaptively switching between two different segment lengths in response to the detection of certain signal conditions such as abrupt signal changes or amplitude transients. This technique is used in the Advanced Audio Coder (AAC), which is described in Bosi et al., "ISO/IEC MPEG-2 Advanced Audio Coding," J. Audio Eng. Soc., vol. 45, no. 10, October 1997, pp. 789-814, and incorporated herein by reference.

In AAC, a MDCT filter bank is applied to stationary source signal segments having a length equal to 2048 samples and is applied to non-stationary source signal segments having a length equal to 256 samples. Block switching is achieved in AAC by using "long window functions" that are appropriate for the longer segments, "short window functions" that are appropriate for the shorter segments, a "long-to-short bridging window function" that allows switching from the longer segment length to the shorter segment length, and a "short-to-long bridging window function" that allows switching from the shorter segment length to the longer segment length. The two bridging window functions allow switching between different segment length while satisfying the criteria necessary for proper operation of the MDCT. A switch from a longer segment length to a shorter segment length and back to the longer length is accomplished by applying the MDCT to a long segment using the long-to-short bridging window function, applying the MDCT to an integer multiple of eight short segments using the short window function, and applying the MDCT to a long segment using the short-to-long bridging window function. Immediately thereafter, the MDCT must be applied to a long segment but the long window function may be used or the long-to-short bridging window function may be used if another block switch is desired.

Although block switching does provide a way to adapt the time and frequency resolution of a MDCT filter bank, it is not an ideal solution for several reasons. One reason is that the frequency selectivity of the transform is degraded during a switch of block lengths because the shape of the bridge window functions must be suboptimal to allow segment-length switching and to satisfy requirements for proper operation of the MDCT. Another reason is that a switch cannot occur at any arbitrary time. As explained above, the MDCT must be applied to another long segment immediately after switching to the longer segment length. An immediate switch to the shorter length is not possible. This block switching technique also is not an ideal solution because the switching mechanism provides only two segment lengths, which are not optimum for all signal conditions. For example, the two segment lengths in AAC are not optimal because neither the longer nor the shorter segment length in AAC is optimum for most speech signal segments. The 2048-sample segments are usually too long for the non-stationary nature of speech and the 256-sample segments are usually too short to remove redundant components effectively. Furthermore, there are many stationary signals for which a segment length longer than 2048 samples would be more optimum. As a result, the performance of AAC is impaired by the limited ability of block switching to adapt the time and frequency resolution of a MDCT filter bank.

Another form of block switching is used in coding systems that conform to the Dolby Digital encoded bit stream standard. This coding standard, sometimes referred to as AC-3, is described in the Advanced Television Systems Committee (ATSC) A/52A document entitled "Revision A to Digital Audio Compression (AC-3) Standard" published Aug. 20, 2001, and incorporated herein by reference. The form of block switching used in AC-3 coding systems applies a MDCT to source signal segments of either 512 samples for stationary signals or 256 samples for non-stationary signals. The block switching technique used in AC-3 coding systems provides more flexibility in choosing when length switches are made. Furthermore, coding performance is reasonably good for non-stationary source signals like speech; however, the coding performance for signals that are more stationary is limited by the relatively low frequency resolution provided by the longer segment.

Other techniques for adaptive control of the time and frequency resolution of a MDCT filter bank are described in U.S. Pat. No. 5,394,473 by Davidson, which issued Feb. 28, 1995 and are incorporated herein by reference. Some of these techniques allow a MDCT filter bank to be applied to segments of essentially any length using window functions that provide much a better frequency response than is possible by other known techniques. Unfortunately, these techniques must adapt the kernel or basis functions of the MDCT and are, therefore, incompatible with existing bit stream standards like the AC-3 standard mentioned above. These techniques are also computationally intensive.

DISCLOSURE OF INVENTION

What is needed is a more efficient and effective way to adapt the frequency resolution of filter banks implemented by transforms like the MDCT. Preferably, the solution should provide an implementation that simplifies its incorporation into systems that are compatible with existing bit stream standards. This is achieved by using a hybrid-transform filter bank that may be implemented by a cascade of block transforms.

According to teachings of the present invention, analysis and synthesis filter banks are implemented by hybrid transforms that comprise a primary transform in cascade with one or more secondary transforms. In one implementation, the primary transform is a MDCT that is applied to source signal segments overlapping one another by one-half the segment length and the secondary transform is a DCT that is applied to non-overlapping blocks of MDCT coefficients for a particular frequency across time. The frequency resolution of the filter banks may be increased by increasing the number of coefficients in the blocks that are transformed by the one or more secondary transforms. The one or more secondary transforms may be applied to blocks of MDCT coefficients having a number of coefficients that varies with coefficient frequency, thereby allowing the frequency resolution of the filter bank to be adapted in a wide variety of ways.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Introduction

Figure 1:
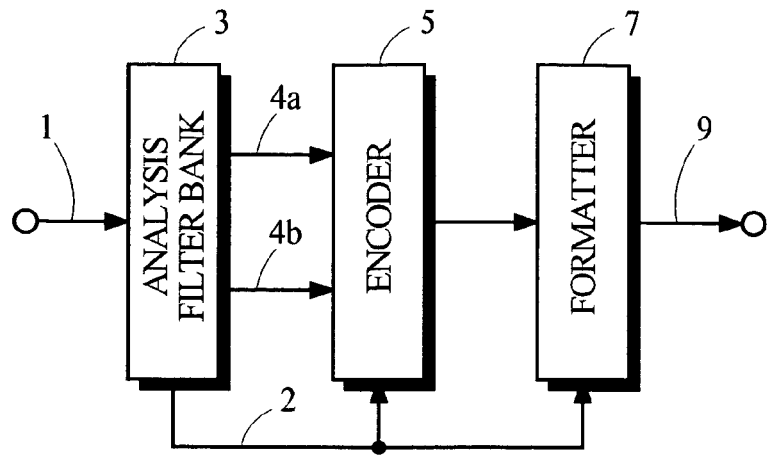
FIG. 1 is a schematic block diagram of a transmitter used in a coding system.
Figure 2:
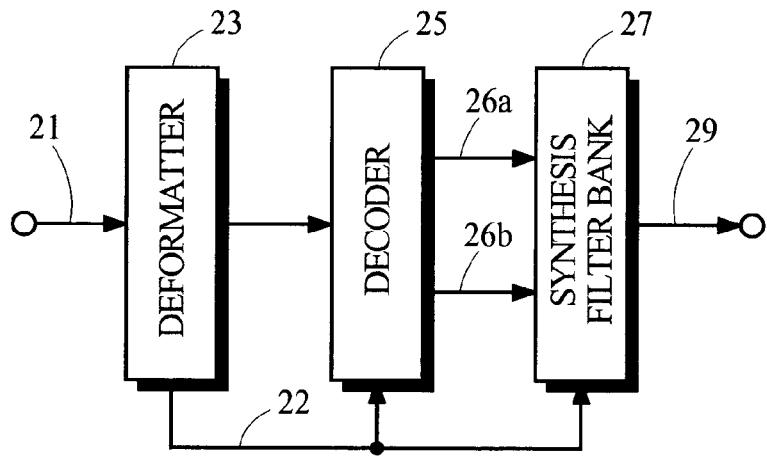
FIG. 2 is a schematic block diagram of a receiver used in a coding system.

The present invention provides a filter bank that is implemented by a hybrid transform whose frequency resolution can be easily adapted. FIGS. 1 and 2 illustrate schematic block diagrams of a transmitter and receiver, respectively, in an audio coding system that may incorporate various aspects of the present invention. Features of the illustrated transmitter and receiver are discussed briefly in the following sections. Following this discussion, pertinent features of analysis and synthesis filter banks are discussed.

1. Transmitter

The transmitter illustrated in FIG. 1 applies the analysis filter bank 3 to a source signal received from the path 1 to generate spectral coefficients that represent the spectral content of the source signal, applies the encoder 5 to the spectral coefficients to generate encoded information, and applies the formatter 8 to the encoded information to generate an output signal suitable for transmission along the path 9. The output signal may be delivered immediately to a receiver or recorded for subsequent delivery. The analysis filter bank 3 may be implemented in variety of ways as described below.

In this disclosure, terms like "encoder" and "encoding" are not intended to imply any particular type of information processing. For example, encoding is often used to reduce information capacity requirements; however, these terms in this disclosure do not necessarily refer to this type of processing. The encoder 5 may perform essentially any type of processing that is desired. In one implementation, encoded information is generated by quantizing spectral coefficients according to a perceptual model using a wide variety of quantization techniques including vector quantization and gain-adaptive quantization described in U.S. Pat. No. 6,246,345 by Davidson et al., which issued Jun. 12, 2001 and is incorporated by reference. No particular type of encoding is important to the present invention.

2. Receiver

The receiver illustrated in FIG. 2 applies the deformatter 23 to an input signal received from the path 21 to obtain encoded information, applies the decoder 25 to the encoded information to obtain spectral coefficients representing the spectral content of a source signal, and applies the synthesis filter bank 27 to the spectral coefficients to generate an output signal along the path 29 that is a replica of the source signal but may not be an exact replica. The synthesis filter bank 27 may be implemented in a variety of ways that are complementary to the implementation of the analysis filter bank 3.

In this disclosure, terms like "decoder" and "decoding" are not intended to imply any particular type of information processing. The decoder 25 may perform essentially any type of processing that is needed or desired. In one implementation that is inverse to an encoding process described above, quantized spectral components are decoded into dequantized spectral coefficients. No particular type of decoding is important to the present invention.

B. Adaptive Hybrid Transform

Figure 4:
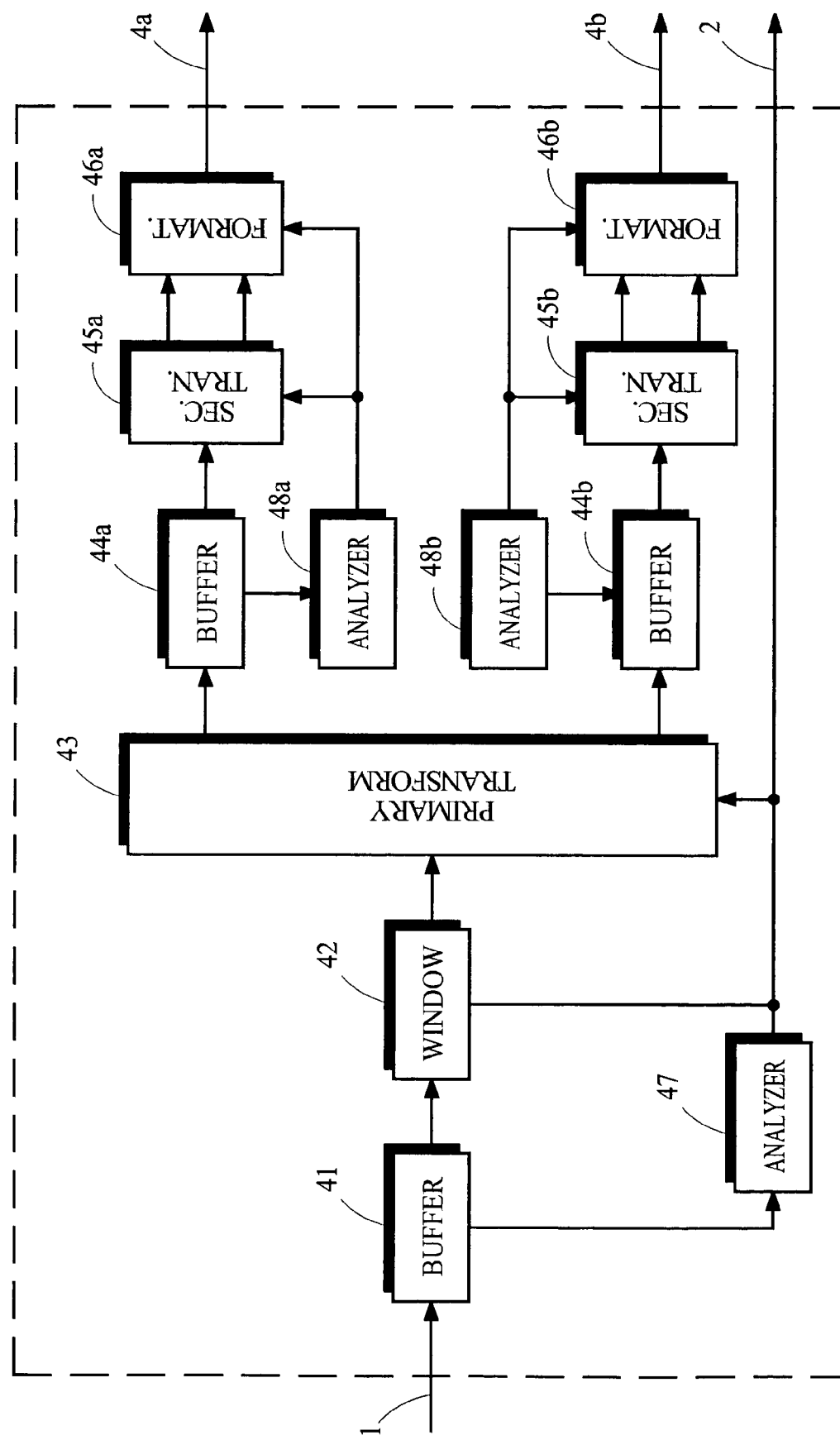
FIG. 4 is a schematic block diagram of an analysis filter bank that incorporates various aspects of the present invention.
Figure 5:
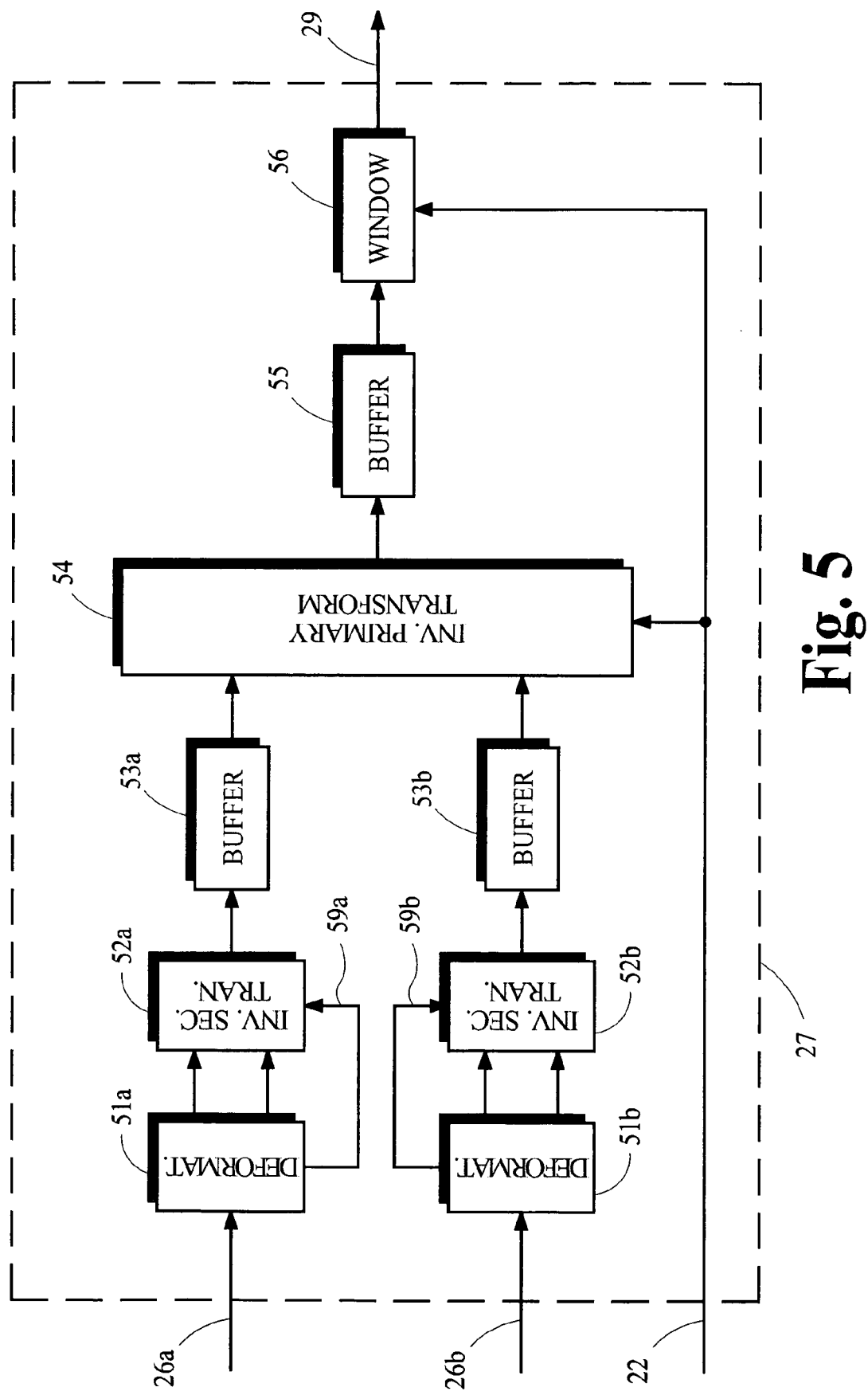
FIG. 5 is a schematic block diagram of an analysis filter bank that incorporates various aspects of the present invention.

The analysis filter bank 3 and the synthesis filter bank 27 comprise hybrid transforms, which may be implemented as shown in FIGS. 4 and 5, respectively.

The analysis filter bank 3 shown in FIG. 4 comprises a primary transform 43 and one or more secondary transforms 45 in cascade with the primary transform. The primary transform is applied to segments of a source signal to generate sets of spectral coefficients that represent the spectral content of the source signal segments. Each of the one or more secondary transforms is applied to blocks of spectral coefficients for a particular frequency across time. The number of coefficients in each block is adapted in response to a control signal.

The synthesis filter bank 27 shown in FIG. 5 comprises one or more inverse secondary transforms 52 and an inverse primary transform 54 in cascade with the inverse secondary transforms. Each of the one or more inverse secondary transforms generates blocks of spectral coefficients for a particular frequency across time. The number of coefficients in each block is adapted in response to a control signal. The blocks of spectral coefficients are assembled into sets of spectral coefficients for a particular time across frequency and the primary transform is applied to the sets of spectral coefficients to generate segments of a signal that are combined to provide a replica of an original source signal.

The primary transforms for the analysis filter bank and the synthesis filter bank implement an analysis/synthesis system in which an inverse primary transform cancels time-domain aliasing artifacts that are generated by the forward primary transform. For example, the Modified Discrete Cosine Transform (MDCT) and the Inverse MDCT (IMDCT) described in the Princen paper mentioned above implement the time-domain equivalent of an oddly-stacked critically sampled single-sideband analysis/synthesis system. These transforms are referred to herein as Oddly-Stacked Time-Domain Aliasing Cancellation (O-TDAC) transforms. Another TDAC implementation is described in Princen et al., "Analysis/Synthesis Filter Bank Design Based on Time Domain Aliasing Cancellation," *IEEE Trans. on Acoust., Speech, Signal Proc.*, vol. ASSP-34, 1986, pp. 1153-1161. The analysis filter bank in this implementation comprises an application of a MDCT and a Modified Discrete Sine Transform (MDST) to alternate signal segments. The synthesis filter bank comprises an application of an IMDCT and an Inverse MDST (IMDST). These transforms implement the time-domain equivalent of an evenly-stacked critically sampled single-sideband analysis/synthesis system and are referred to as Evenly-Stacked Time-Domain Aliasing Cancellation transforms.

The secondary transforms may be implemented by any of a number of transforms including the Discrete Cosine Transform (DCT), the Discrete Sine Transform (DST), and the Discrete Fourier Transform (DFT).

In a preferred implementation of the analysis filter bank 3, a type-II DCT is used in cascade with the O-TDAC MDCT mentioned above. In a counterpart implementation of the synthesis filter bank 27, the O-TDAC IMDCT is used in cascade with a type-II Inverse DCT (IDCT). These implementations are discussed in more detail below.

1. Analysis Filter Bank

Referring to FIG. 4, a sequence of source signal samples are received from the path 1 and stored in the buffer 41. The analyzer 47 is an optional component that determines the number of source signal samples in each segment, or segment length, to use for subsequent processing by applying some analytical process to the stored samples. Essentially any analytical process may be used as desired. For example, amplitude transients may be detected as described in the ATSC A/52A document cited above. Information representing chosen segment lengths is passed along the path 2 to the formatter 7 for inclusion in the output signal. Fixed length segments are used in an alternative implementation that omits the analyzer 47 and the path 2.

a) Analysis Window Function

The window 42 forms a sequence of overlapping segments by weighting the source signal samples in each segment with an analysis window function. The length and shape of the analysis window function for each segment is adapted in response to the segment length information received from the path 2. A wide variety of window functions may be used but a Kaiser-Bessel-Derived (KBD) window function is generally preferred because it has excellent frequency selectivity properties. This window function is derived from a Kaiser-Bessel window function that may be expressed as:

$$W(n) = \frac{I_0\left[\pi\alpha\sqrt{1-\left(\frac{n}{N/2}\right)^2}\right]}{I_0[\pi\alpha]} \text{ for } 0 \leq n < N \quad (1)$$

where α=Kaiser-Bessel alpha factor,
  n=window function sample number,
  N=window function length in number of samples, and $$I_0[x] = \sum_{k=0}^{\infty} \frac{(x/2)^k}{k!}$$

An alpha value in the range from 4 to 7 works well for typical audio coding applications.

The derivation convolves the Kaiser-Bessel window function W(n) with a rectangular window function having a length equal to the desired window function length N minus an overlap interval v. See expression 2. This convolution may be simplified as shown in expression 3.

$$WP(n) = \frac{\sum_{k=0}^{N-1} s(k)W(n-k)}{\sum_{k=0}^{v} W(k)} \text{ for } 0 \leq n < N \quad (2)$$

$$WP(n) = \frac{\sum_{k=0}^{N-v-1} W(n-k)}{\sum_{k=0}^{v} W(k)} \text{ for } 0 \leq n < N \quad (3)$$

where v=number of samples within the segment overlap interval,
N=desired length of the window function,
W(n)=Kaiser-Bessel window function of length v+1,
WP(n)=derived product-window of length N, and $$s(k) = \begin{bmatrix} 1 & \text{for } 0 \leq k < N-v \\ 0 & \text{otherwise} \end{bmatrix}$$

The KBD analysis window function may be obtained by taking the square root of the derived product-window WP(n). This analysis window function is shown in expression 4.

$$WA(n) = \sqrt{\frac{\sum_{k=0}^{N/2-1} W(n-k)}{\sum_{k=0}^{N/2} W(k)}} \text{ for } 0 \leq n < N \quad (4)$$

b) Primary Transform

The primary transform 43 transforms each segment of windowed source signal samples into a set of spectral coefficients. Each coefficient in a set of coefficients represents the spectral content of a windowed segment for a particular frequency. The O-TDAC MDCT is used in a preferred implementation. This transform may be expressed as:

$$C(k, m) = \sum_{n=0}^{N-1} x\left(n + m \cdot \frac{N}{2}\right) \cdot WA(n) \cdot \cos\left[\frac{2\pi\left(k + \frac{1}{2}\right)\left(n + \frac{N}{4} + \frac{1}{2}\right)}{N}\right] \quad (5)$$

for $0 \leq k < N$ where k=frequency coefficient number,
n=input signal sample number,
m=source signal segment number,
N=source signal segment length,
x(n)=value of source signal x at sample n, and
C(k)=MDCT coefficient k.

The O-TDAC MDCT produces a set of spectral coefficients of the form $$\{C(k, m)\} = \begin{bmatrix} C(k, m) & \text{for } 0 \leq k < \frac{N}{2} \\ 0 & \text{for } k = \frac{N}{2} \end{bmatrix} \quad (6)$$

The primary transform may be implemented directly according to expression 5 or it may be implemented by processes that are computationally more efficient such as those using the Fast Fourier Transform (FFT) described in U.S. Pat. No. 5,394,473. The analysis window function and the primary transform may be adapted in response to segment length using essentially any process that may be desired. A few techniques are disclosed in U.S. Pat. No. 5,214,742, U.S. Pat. No. 5,394,473, the ATSC A/52A document, and the ISO/MPEG AAC document cited above.

Spectral coefficients representing the spectral content of the windowed source signal segments for each of one or more respective frequencies are passed along respective signal paths and stored in buffers. The transmitter shown in FIG. 4, for example, passes spectral coefficients for each of two respective frequencies along one of two signal paths for storage in the buffers 44a and 44b. Only two signal processing paths are shown in FIG. 4 for illustrative clarity. Implementations of the analysis filter bank 3 for use in typical systems could have hundreds of paths.

c) Spectral Component Analysis

Referring to the upper signal path shown in FIG. 4, spectral coefficients for a particular frequency in a sequence of segments are stored in the buffer 44a and assembled into blocks. The analyzer 48a determines the number of coefficients in each block, which is the block length, and passes this length along the path 49a. This length may be determined by analyzing the coefficients that are stored in the buffer 44a. No particular method of analysis is critical in principle to the present invention. A few analytical methods are described here.

One basic method forms the longest possible blocks of spectral coefficients in which the coefficients in a respective block are sufficiently similar in magnitude. This may be determined in a variety of ways. One way calculates differences in magnitude between adjacent spectral coefficients and identifies the longest block of adjacent coefficients in which the average difference is less than some threshold. Another way uses spectral coefficients that are stored in buffers for multiple signal paths. This approach sums the magnitude differences for a band of spectral coefficients and identifies the longest block in which the average difference across the band is less than some threshold. The width of the band may be commensurate with the so called critical bandwidths of the human auditory system.

Another basic method relies on signal analysis that is performed by signal encoding processes performed elsewhere in a transmitter. A transmitter that is compatible with the bit stream standard described in the A/52A document cited above, for example, generates an encoded signal with spectral coefficients represented as scaled values that are associated with scale factors. The scale factors are analyzed to identify sequences of MDCT coefficient sets that can share a common set of scale factors. The analyzer 48a adapts the block length for its respective signal path to equal the number of coefficient sets that share exponents.

d) Secondary Transform

The secondary transform 45a transforms each block of spectral coefficients into a set of hybrid-transform coefficients. The length of the transform is adapted in response to the block length information received from the path 49a. In a preferred implementation, a type II DCT is applied to blocks of spectral coefficients that do not overlap one another. This transform may be expressed as:

$$X(k, j) = \sqrt{\frac{2}{M}} \cdot R_j \cdot \sum_{m=0}^{M-1} C(k, m) \cos\left[\frac{j(2m+1)\pi}{2M}\right] \text{ for } 0 \leq j < M \quad (7)$$

where X(k,j)=hybrid transform coefficient j for MDCT coefficient k,
M=length of block of MDCT coefficients k, and $$R_j = \begin{bmatrix} \frac{1}{\sqrt{2}} & \text{for } j = 0 \\ 1 & \text{for } j \neq 0 \end{bmatrix}$$

The secondary transform may be implemented directly according to expression 7 or it may be implemented by known processes that are computationally more efficient such as those described in chapter 4 of Rao et al., "Discrete Cosine Transform," Academic Press, Inc., 1990.

e) Formatter and Other Signal Paths

The formatter 46a is an optional component that may be used to assemble the hybrid-transform coefficients and block length information into data that the encoder 5 and the formatter 7 can process. This allows the analysis filter bank 3 in the transmitter shown in FIG. 1 to be implemented by a hybrid transform with minimal changes to the rest of the transmitter.

The buffer 44b, the analyzer 48b, the secondary transform 45b, and the formatter 46b perform processes in the lower signal path that are analogous to those discussed above for the respective components in the upper signal path.

f) Encoding

In typical systems, the encoder 5 generates encoded information that represents the hybrid-transform coefficients in some encoded form. If perceptual encoding processes are used, the hybrid-transform coefficients are encoded into a form that reduces perceptual irrelevancy. Perceptual encoding processes usually cause spectral information to be lost that cannot be recovered or recreated by the receiver. The possibility of this loss is represented below by the symbol $\hat{X}(k, j)$, which denotes a possible modification to the hybrid-transform coefficients generated by the hybrid transform. The use of such encoding processes are not critical to the present invention.

2. Synthesis Filter Bank

Referring to FIG. 5, the deformatters 51a and 51b obtain hybrid transform coefficients and block length information from data that is received from the paths 26a and 26b, respectively. The block length information is passed along the paths 59a and 59b, and the hybrid-transform coefficients are passed to the inverse secondary transforms 52a and 52b. Only two signal processing paths are shown in FIG. 5 for illustrative clarity. Implementations of the synthesis filter bank 27 for use in typical systems could have hundreds of paths.

The deformatter 51b, the inverse secondary transform 52b, and the buffer 53b perform processes in the lower signal path that are analogous to those discussed below for the respective components in the upper signal path.

a) Deformatter

Referring to the upper signal path shown in FIG. 5, the deformatter 51a is an optional component that may be used to disassemble sets of hybrid-transform coefficients and block length information from data that is received from the deformatter 23 and the decoder 25. This allows a hybrid-transform implementation of the synthesis filter bank 27 to be incorporated into an existing receiver as shown in FIG. 2 with minimal changes to the rest of the receiver.

b) Inverse Secondary Transform

The inverse secondary transform 52a transforms a set of hybrid-transform coefficients into a block of spectral coefficients that represent the spectral content for a particular frequency of a sequence of source signal segments. The block of spectral coefficients are stored in the buffer 53a. The length of the transform is adapted in response to the block length information received from the path 59a. In a preferred implementation, a type II IDCT is applied to blocks of spectral coefficients that do not overlap one another. This transform may be expressed as:

$$\hat{C}(k, m) = \sqrt{\frac{2}{M}} \cdot \sum_{j=0}^{M-1} R_j \cdot \hat{X}(k, j) \cos\left[\frac{j(2m+1)\pi}{2M}\right] \quad (8)$$

$$\text{for } 0 \leq m < M$$

where $\hat{C}(k, m)$=MDCT coefficient k obtained from encoded hybrid-transform coefficients.

The inverse secondary transform may be implemented directly according to expression 8 or it may be implemented by known processes that are computationally more efficient.

c) Inverse Primary Transform

The buffers 53a and 53b store spectral coefficients and pass them to the inverse primary transform 54 in such a way that the inverse primary transform receives sets of spectral coefficients that represent the spectral content of respective source signal segments. Segments of signal samples are generated by applying an inverse transform to the sets of spectral coefficients and stored in the buffer 55. The length of the inverse primary transform is adapted in response to segment length information received from the path 22. The O-TDAC IMDCT is used in a preferred implementation.

In typical applications, half of the MDCT coefficients are discarded in the transmitter. The discarded coefficients may be recovered by the receiver using the following expression:

$$\hat{C}(k) = -\hat{C}(N-k) \text{ for } N/2 < k < N \quad (9)$$

The O-TDAC IMDCT may be expressed as:

$$\hat{x}\left(n + m \cdot \frac{N}{2}\right) = \frac{1}{N} \sum_{k=0}^{N-1} \hat{C}(k, m) \cdot \cos\left[\frac{2\pi\left(k + \frac{1}{2}\right)\left(n + \frac{N}{4} + \frac{1}{2}\right)}{N}\right] \quad (10)$$

for $0 \le n < N$ where $\hat{x}$=recovered signal sample.

The inverse primary transform may be implemented directly according to expression 10 or it may be implemented by known processes that are computationally more efficient such as those using the FFT described in U.S. Pat. No. 5,394,473.

d) Synthesis Window Function

The window 56 generates an output signal along the path 29 by weighting the segments of signal samples that are stored in the buffer 55 with a synthesis window function and adding the weighted samples in overlapping segments to one another in the overlapping portions. The inverse primary transform, synthesis window function and the overlap-add process cancel at least a substantial portion of the time-domain aliasing artifacts that were generated by the forward transform. Cancellation may not be exact because of modifications to the transform coefficients that were caused by encoding processes and by finite arithmetic precision in the calculations of the primary and secondary transforms. The length and shape of the synthesis window function for each segment is adapted in response to the segment length information received from the path 22. A KBD window function that is equal to the analysis window function WA show above in expression 4 is used in a preferred implementation.

The synthesis window function and the inverse primary transform may be adapted in response to the segment length information using processes such as those referred to above.

C. Implementation

The preceding disclosure sets forth only a few implementations. A variety of transforms and transform types may be used. Principles of the present invention may be applied and implemented in a wide variety of ways.

Figure 3:
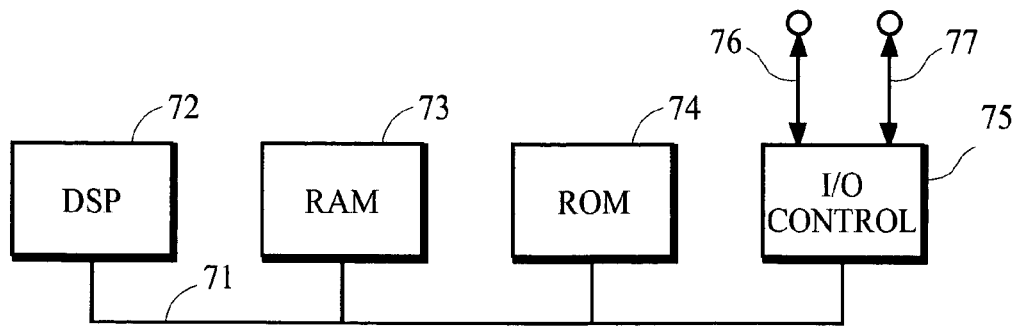
FIG. 3 is a schematic block diagram of a device that may be used to implement various aspects of the present invention.

Devices that incorporate various aspects of the present invention may be implemented in a variety of ways including software for execution by a computer or some other apparatus that includes more specialized components such as digital signal processor (DSP) circuitry coupled to components similar to those found in a general-purpose computer. FIG. 3 is a schematic block diagram of device 70 that may be used to implement aspects of the present invention. DSP 72 provides computing resources. RAM 73 is system random access memory (RAM) used by DSP 72 for signal processing. ROM 74 represents some form of persistent storage such as read only memory (ROM) for storing programs needed to operate device 70 and to carry out various aspects of the present invention. I/O control 75 represents interface circuitry to receive and transmit signals by way of communication channels 76, 77. Analog-to-digital converters and digital-to-analog converters may be included in I/O control 75 as desired to receive and/or transmit analog signals. In the embodiment shown, all major system components connect to bus 71, which may represent more than one physical bus; however, a bus architecture is not required to implement the present invention.

In embodiments implemented in a general purpose computer system, additional components may be included for interfacing to devices such as a keyboard or mouse and a display, and for controlling a storage device having a storage medium such as magnetic tape or disk, or an optical medium. The storage medium may be used to record programs of instructions for operating systems, utilities and applications, and may include embodiments of programs that implement various aspects of the present invention.

The functions required to practice various aspects of the present invention can be performed by components that are implemented in a wide variety of ways including discrete logic components, integrated circuits, one or more ASICs and/or program-controlled processors. The manner in which these components are implemented is not important to the present invention.

Software implementations of the present invention may be conveyed by a variety of machine readable media such as baseband or modulated communication paths throughout the spectrum including from supersonic to ultraviolet frequencies, or storage media that convey information using essentially any recording technology including magnetic tape, cards or disk, optical cards or disc, and detectable markings on media like paper.

The invention claimed is:

1. A method for generating an output signal that comprises:
   receiving samples of a source signal having spectral content;
   applying a primary transform to overlapping segments of the samples to generate a plurality of sets of spectral coefficients, wherein each set of spectral coefficients has time-domain aliasing artifacts and represents the spectral content of a respective source signal segment for a set of frequencies;
   generating one or more sets of hybrid-transform coefficients by applying a secondary transform to one or more blocks of the spectral coefficients representing spectral content of the source signal for a particular frequency in the set of frequencies across time, wherein the number of spectral coefficients in each of the one or blocks representing the particular frequency is adapted in response to a block-length control signal and the length of the secondary transform that is applied to each of the one or more blocks of spectral coefficients is adapted in response to the block-length control signal; and
   assembling information representing the one or more sets of hybrid-transform coefficients and the block-length control signal into the output signal.

2. The method according to claim 1 wherein the primary transform is a Modified Discrete Cosine Transform and the secondary transform is a Discrete Cosine Transform that is applied to blocks of spectral coefficients that do not overlap one another.

3. The method according to claim 2 that comprises:
   generating a measure of similarity for spectral component magnitudes within a plurality of sets of spectral components; and
   generating the block-length control signal in response to the measure of similarity.

4. The method according to claim 2 that comprises:
   analyzing samples of the source signal to generate a segment-length control signal; and
   applying an analysis window function to a segment of samples of the source signal, wherein shape or length of the analysis window function is adapted in response to the segment-length control signal.

5. The method according to claims 1 through 4 wherein the primary transform has a set of basis functions and the method comprises adapting the set of basis functions in response to the segment-length control signal.

6. A method for generating a output signal that comprises:
receiving an input signal that represents spectral content of a source signal;
obtaining one or more sets of hybrid-transform coefficients and a block-length control signal from the input signal;
applying an inverse secondary transform to the one or more sets of hybrid-trnaform coefficients to generate one or more blocks of spectral coefficients representing spectral content of the source signal for a particular frequency in a set of frequencies across time, wherein the number of hybrid-transform coefficients in each of the one or more sets of hybrid-transform coefficients is adapted in response to the block-length control signal and the length of the inverse secondary transform that is applied to the sets of hybrid-transform coefficients is adapted in response to the block-length signal;
assembling the spectral coefficients into sets of spectral coefficients, wherein each set of spectral coefficients has a time-domain aliasing artifacts and represents the spectral content of a segment of the source signal for all frequencies;
applying an inverse primary transform to the sets of spectral coefficients to generate output signal segments that corresponds to the segments of the source signal, wherein the inverse primary transform substantially cancels the time-domain aliasing artifacts.

7. The method according to claim 6 wherein the inverse primary transform is an Inverse Modified Discrete Cosine Transform and the inverse secondary transform is an Inverse Discrete Cosine Transform that is applied to sets of hybrid-transform coefficients representing blocks of spectral coefficients that do not overlap one another.

8. The method according to claim 7 that comprises:
obtaining a segment-length control signal from the input signal; and
applying a synthesis window function to an output signal segment, wherein shape or length of the synthesis window function is adapted in response to the segment-length control signal.

9. The method according to any one of claims 6 through 8 wherein the inverse primary transform has a set of basis functions and the method comprises adapting the set of basis functions in response to the segment-length control signal.

10. An apparatus for generating an output signal that comprises:
(a) an input terminal;
(b) an output terminal; and
(c) signal processing circuitry coupled to the input terminal and the output terminal, wherein the signal processing circuitry is adapted to:
receive samples of a source signal having spectral content from the input terminal;
apply a primary transform to overlapping segments of the samples to generate a plurality of sets of spectral coefficients, wherein each set of spectral coefficients has time-domain aliasing artifacts and represents the spectral content of a respective source signal segment for a set of frequencies;
generate one or more sets of hybrid-transform coefficients by applying a secondary transform to the one or more blocks of the spectral coefficients representing spectral content of the source signal for a particular frequency in the set of frequencies across time, wherein the number of spectral coefficients in each of the one or blocks representing the particular frequency is adapted in response to a block-length control signal and the length of the secondary transform that is applied to each of the one or more blocks of spectral coefficients is adapted in response to the block-length control signal; and
assemble information representing the one or more sets of hybrid-transform coefficients and the block-length control signal into the output signal that is sent to the output terminal.

11. The apparatus according to claim 10 wherein the primary transform is a Modified Discrete Cosine Transform and the secondary transform is a Discrete Cosine Transform that is applied to blocks of spectral coefficients that do not overlap one another.

12. The apparatus according to claim 11 wherein the signal processing circuitry is adapted to:
generate a measure of similarity for spectral component magnitudes within a plurality of sets of spectral components; and
generate the block-length control signal in response to the measure of similarity.

13. The apparatus according to claim 11 wherein the signal processing circuitry is adapted to:
analyze samples of the source signal to generate a segment-length control signal; and
apply an analysis window function to a segment of samples of the source signal, wherein shape or length of the analysis window function is adapted in response to the segment-length control signal.

14. The apparatus according to any one of claims 10 through 13 wherein the primary transform has a set of basis functions and the signal processing circuitry adapts the set of basis functions in response to the segment-length control signal.

15. An apparatus for generating an output signal that comprises:
(a) an input terminal;
(b) an output terminal; and
(c) signal processing circuitry coupled to the input terminal and the output terminal, wherein the signal processing circuitry is adapted to:
receive an input signal that represents spectral content of a source signal from the intput terminal;
obtain one or more sets of hybrid-transform coefficients and a block-length control signal from the input signal;
apply an inverse secondary transform to the one or more sets of hybrid-transform coefficients to generate one or more blocks of spectral coefficients representing spectral content of the source signal for a particular frequency in a set of frequencies across time, wherein the number of hybrid-transform coefficients in each of the one or more sets of hybrid-transform coefficients is adapted in response to the block-length control signal and the length of the inverse secondary transform that is applied to the sets of hybrid-transform coefficients is adapted in response to the block-length control signal;
assemble the spectral coefficients into sets of spectral coefficients, wherein each set of spectral coefficients has time-domain aliasing artifacts and represents the spectral content of a segment of the source signal for all frequencies in the set of frequencies; and
apply an inverse primary transform to the sets of spectral coefficients to generate output signal segments that correspond to segments of the source signal, wherein the inverse primary transform substantially cancels the time-domain aliasing artifacts and the output signal segments are sent to the output terminal.

16. The apparatus according to claim 15 wherein the inverse primary transform is an Inverse Modified Discrete Cosine Transform and the inverse secondary transform is an Inverse Discrete Cosine Transform that is applied to sets of hybrid-transform coefficients representing blocks of spectral coefficients that do not overlap one another.

17. The apparatus according to claim 16 wherein the signal processing circuitry is adapted to:
  obtain a segment-length control signal from the input signal; and
  apply a synthesis window function to an output signal segment, wherein shape or length of the synthesis window function is adapted in response to the segment-length control signal.

18. The apparatus according to any one of claims 15 through 17 wherein the inverse primary transform has a set of basis functions and the signal processing circuitry adapts the set of basis functions in response to the segment-length control signal.

19. A storage medium recording a program of instructions that is executable by a device to perform a method for generating an output signal that comprises:
  receiving samples of a source signal having spectral content;
  applying a primary transform to overlapping segments of the samples to generate a plurality of sets of spectral coefficients, wherein each set of spectral coefficients has time-domain aliasing artifacts and represents the spectral content of a respective source signal segment for a set of frequencies;
  generating one or more sets of hybrid-transform coefficients by applying a secondary transform to one or more blocks of the spectral coefficients representing spectral content of the source signal for a particular frequency in the set of frequencies across time, wherein the number of spectral coefficients in each of the one or more blocks representing the particular frequency is adapted in response to a block-length control signal and the length of the secondary transform that is applied to each of the one or more blocks of spectral coefficients is adapted in response to the block-length control signal; and
  assembling information representing the one or more sets of hybrid-transform coefficients and the block-length control signal into the output signal.

20. The storage medium according to claim 19 wherein the primary transform is a Modified Discrete Cosine Transform and the secondary transform is a Discrete Cosine Transform that is applied to blocks of spectral coefficients that do not overlap one another.

21. The storage medium according to claim 20, wherein the method comprises:
  analyzing samples of the source signal to generate a segment-length control signal; and applying an analysis window function to a segment of samples of the source signal, wherein shape or length of the analysis window function is adapted in response to the segment-length control signal.

22. A storage medium recording a program of instructions that is executable by a device to perform a method for generating an output signal that comprises:
  receiving an input signal that represents spectral content of a source signal;
  obtaining one or more sets of hybrid-transform coefficients and a block-length control signal from the input signal;
  applying an inverse secondary transform to the one or more sets of hybrid-transform coefficients to generate one or more blocks of spectral coefficients representing spectral content of the source signal for a particular frequency in a set of frequencies across time, wherein the number of hybrid-transform coefficients in each of the one or more sets of hybrid-transform coefficients is adapted in response to the block-length control signal and the length of the inverse secondary transform that is applied to the sets of hybrid-transform coefficients is adapted in response to the block-length control signal;
  assembling the spectral coefficients into sets of spectral coefficients, wherein each set of spectral coefficients has time-domain aliasing artifacts and represents the spectral content of a segment of the source signal for all frequencies in the set of frequencies;
  applying an inverse primary transform to the sets of spectral coefficients to generate output signal segments that correspond to segments of the source signal, wherein the inverse primary transform substantially cancels file time-domain aliasing artifacts.

23. The storage medium according to claim 22 wherein the inverse primary transform is an Inverse Modified Discrete Cosine Transform and the inverse secondary transform is an Inverse Discrete Cosine Transform that is applied to sots of hybrid-transform coefficients representing blocks of spectral coefficients that do not overlap one another.

24. The storage medium according to claim 23, wherein the method comprises:
  obtaining a segment-length control signal From the input signal; and
  applying a synthesis window function to an output signal segment, wherein shape or length of the synthesis window function is adapted in response to the segment-length control signal.

* * * * *

UNITED STATES PATENT AND TRADEMARK OFFICE
CERTIFICATE OF CORRECTION

| | | |
|---|---|---|
| PATENT NO. | : 7,516,064 B2 | Page 1 of 2 |
| APPLICATION NO. | : 10/783951 | |
| DATED | : April 7, 2009 | |
| INVENTOR(S) | : Mark Stuart Vinton and Grant Allen Davidson | |

It is certified that error appears in the above-identified patent and that said Letters Patent is hereby corrected as shown below:

Column 12, line 41, claim 1 "one or blocks" should be --one or more blocks--.

Column 13, line 1, claim 5 "according to claims" should be --according to any one of claims--.

Column 13, line 5, claim 6 "generating a output" should be --generating an output--.

Column 13, line 11, claim 6 "trnaform" should be --transform--.

Column 13, line 20, claim 6 "block-length signal" should be --block-length control signal--.

Column 13, line 23, claim 6 the word "a" should be deleted.

Column 13, line 25, claim 6 "frequencies;" should be --frequencies in the set of frequencies;--.

Column 13, line 28, claim 6 "to the segments" should be --to segments--.

Column 13, line 64, claim 10 "to the one or" should be --to one or--.

Column 14, line 2, claim 10 "one or blocks" should be --one or more blocks--.

Column 16, line 35, claim 22 "cancels file" should be --cancels the--.

Column 16, line 40, claim 23 "sots" should be --sets--.

UNITED STATES PATENT AND TRADEMARK OFFICE
CERTIFICATE OF CORRECTION

PATENT NO. : 7,516,064 B2
APPLICATION NO. : 10/783951
DATED : April 7, 2009
INVENTOR(S) : Mark Stuart Vinton and Grant Allen Davidson It is certified that error appears in the above-identified patent and that said Letters Patent is hereby corrected as shown below:

Column 16, line 45, claim 24 "From" should be --from--.

Signed and Sealed this

Twenty-fourth Day of November, 2009

David J. Kappos
*Director of the United States Patent and Trademark Office*